(12) United States Patent
Wu et al.

(10) Patent No.: US 9,432,275 B2
(45) Date of Patent: Aug. 30, 2016

(54) TRANSMISSION MONITORING METHOD AND DEVICE

(71) Applicant: ZTE CORPORATION, Shenzhen (CN)

(72) Inventors: Shaoyong Wu, Shenzhen (CN); Yuxi Gan, Shenzhen (CN); Jin Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/410,400

(22) PCT Filed: May 7, 2013

(86) PCT No.: PCT/CN2013/075274
§ 371 (c)(1),
(2) Date: Dec. 22, 2014

(87) PCT Pub. No.: WO2014/000509
PCT Pub. Date: Jan. 3, 2014

(65) Prior Publication Data
US 2015/0341242 A1    Nov. 26, 2015

(30) Foreign Application Priority Data
Jun. 25, 2012  (CN) .......................... 2012 1 0210436

(51) Int. Cl.
*H04L 12/26*    (2006.01)

(52) U.S. Cl.
CPC ........... *H04L 43/0835* (2013.01); *H04L 12/26* (2013.01)

(58) Field of Classification Search
CPC ........................... H04L 12/26; H04L 43/0835
USPC ........................................................ 370/242
See application file for complete search history.

(56) References Cited

U.S. PATENT DOCUMENTS

| | | | | |
|---|---|---|---|---|
| 4,561,090 A * | 12/1985 | Turner | ................ | H04L 43/0817 370/231 |
| 5,963,551 A * | 10/1999 | Minko | ................ | H04L 12/6418 370/356 |
| 2010/0039943 A1* | 2/2010 | Ryoo | ................... | H04L 43/0835 370/242 |
| 2010/0254262 A1 | 10/2010 | Kantawala et al. | | |
| 2010/0302949 A1* | 12/2010 | Fukagawa | ........... | H04L 43/0841 370/241.1 |
| 2011/0069626 A1* | 3/2011 | Sun | ...................... | H04L 12/2697 370/252 |
| 2011/0188380 A1* | 8/2011 | Song | ................... | H04L 43/0829 370/241.1 |
| 2012/0155286 A1* | 6/2012 | Yoshikoa | ............ | H04L 43/0829 370/242 |

FOREIGN PATENT DOCUMENTS

| | | |
|---|---|---|
| CN | 1525693 | 9/2004 |
| CN | 101616037 | 12/2009 |
| CN | 201699731 | 1/2011 |
| CN | 102752169 | 10/2012 |
| WO | WO 02/09369 | 1/2002 |
| WO | WO 2008/050929 | 5/2008 |

*Primary Examiner* — Stephen J Clawson
(74) *Attorney, Agent, or Firm* — Pearl Cohen Zedek Latzer Baratz LLP (57) ABSTRACT

A transmission monitoring method and apparatus are provided. The method includes: in a case that an input port of a network node receives M frames, counting the number N of frames sent by an output port of the network node corresponding to the received M frames; in a case that the M is different from the N, determining that frame loss exists in the network node, wherein the M and the N are positive integers. Through the method and apparatus of the present document, the problems of failing to determine a specific device where the frame loss occurs and the construction cost being high are solved, the accuracy and the flexibility of monitoring a position of the frame loss are improved, and the construction cost is reduced.

18 Claims, 3 Drawing Sheets

TRANSMISSION MONITORING METHOD AND DEVICE

CROSS-REFERENCE TO RELATED APPLICATIONS

This application is a National Phase Application of PCT International Application No. PCT/CN2013/075274, entitled "TRANSMISSION MONITORING METHOD AND DEVICE", International Filing Date May 7, 2013, published on Jan. 3, 2014 as International Publication No. WO 2014/000509, which in turn claims priority from Chinese Patent Application No. 201210210436.4, filed Jun. 25, 2012, all of which are incorporated herein by reference in their entirety.

TECHNICAL FIELD

The present document relates to the communication field, and in particular, to a transmission monitoring method and apparatus.

BACKGROUND OF THE RELATED ART

The network device will cause the service interruption when the frame flow loss appears in the transmission process, and there are many kinds of technologies in the industry to quickly monitor the situation of flow transmission of the network. For example, according to the definition of the Operation Administration Maintenance (abbreviated as OAM), the end-to-end frame (the frame also can be called as packet or message) loss of the network is measured by adopting the on-demand frame Loss Measurement (abbreviated as LM) function.

In the OAM, on two Maintenance Entity Group (abbreviated as MEG) End Point (MEP) devices (the device is also called the node or the device node in this text) of one EMG, the source MEP sends the frame Loss Measurement Message (abbreviated as LMM) to the sink MEP (that is, the opposite end MEP), and then the sink MEP feeds back the frame Loss Measurement Response (abbreviated as LMR) to the source MEP, and the source MEP synthetically calculates the number of the lost frames and the frame loss rate from the local information and information carried in the received LMR.

When the frame loss is measured by adopting the LM function, the following several parameters need to be used:

TxFCf: the count of local transmitted frames when sending the LMM;

RxFCf: the count of local received frames when receiving the LMM;

TxFCb: the count of local transmitted frames when sending the LMR.

When the source MEP sends the LMM frame, the TxFCf is written into the LMM frame; when the sink MEP receives the LMM frame, the TxFCf of the received LMM frame is copied into the LMR, and the RxFCf and the TxFCb are written into the LMR, and then the sink MEP sends the LMR frame; when the source MEP receives the LMR frame, it records the TxFCf, the RxFCf and the TxFCb in the LMR frame and the count RxFC 1 of local received frames at the moment that the LMR frame has already been received.

If the above-mentioned count values after the source MEP receives the LMR are TxFCf [tc], RxFCf [tc], TxFCb [tc] and RxFC1 [tc] respectively, and last above-mentioned count values are TxFCf [tp], RxFCf [tp], TxFCb [tp] and RxFC1 [tp] respectively, then the count of lost frames calculated by the source MEP is as follows:

the number of lost frames from the sink MEP to the source MEP, Frame Loss [far-end]=|TxFCf[tc]−TxFCf[tp]|−|RxFCf[tc]−RxFCf[tp]| the number of lost frames from the source MEP to the sink MEP, Frame Loss [near-end]=|TxFCb [tc]−TxFCb [tp]|−|RxFC1 [tc]−RxFC1[tp]|.

Figure 1:
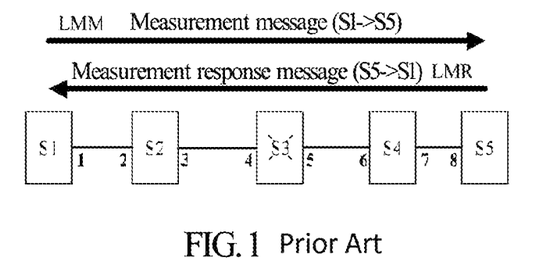
FIG. 1 is a diagram of a frame loss measurement technology according to the related technology.

The LM function of the OAM needs the protocol cooperation of multiple devices, which can only be used for monitoring the situation of frame transmission from device to device in the network; as to the situation of the frame loss within a single device of the packet switching network (such as, the Ethernet, the internet protocol (abbreviated as IP) network, the Multi-Protocol Label Switching (abbreviated as the MPLS) network, the MPLS Transport Profile (abbreviated as the MPLS-TP) network and the Packet Transport Network (abbreviated as PTN) network, etc.), it is not applicable to the scene requiring to monitor the frame loss of the single device. FIG. 1 is a diagram of a frame loss measurement technology according to the related art. As shown in FIG. 1, the figure is a diagram of monitoring the network frame transmission by using the LM function of the OAM, and the device node S1 sends the LMM frame from the port 1 and writes the TxFCf of the port 1 of the device node S1 into the LMM frame; after the device node S5 receives the LMM frame, it copies the TxFCf of the received LMM frame into the LMR and writes the RxFCf and the TxFCb of the port 8 into the LMR, and then sends the LMR frame; the device node S1 calculates the count of the frame loss between the device nodes S1 and S5 according to the frame count and the count of the received frames of the present device node after receiving the LMR frame.

However, this method can only calculate the end-to-end count of lost frames among the devices, and cannot be used for measuring the frame loss within the single device. For example, in FIG. 1, in the path between the device nodes S1 and S5, the frame is lost within the device node S3; and the device nodes S1 and S5 can detect that there is the frame loss in the path, but it is unable to determine which device has the frame loss. In addition, the LM function of the OAM needs the protocol cooperation among multiple device nodes, and the applications are more complicated; if there are some devices in the network which do not support the function, then the function is unable to be applied by the network, so the application scene is limited, and the construction cost is higher.

And in the project application, only when quickly locating which specific device has the frame loss, it can further analyze the specific reason why the frame loss occurs in the device, and find out the basic problem. So, the project needs a more flexible and more economical and practical device transmission monitoring method.

For the problems of failing to determine a specific device where the frame loss occurs and the construction cost being high in the related technology, the effective solution has not been proposed yet at present.

SUMMARY OF THE INVENTION

Aiming at the problems of failing to determine a specific device where the frame loss occurs and the construction cost being high in the related art, the embodiment of the present document provides a transmission monitoring method and apparatus, to at least solve the above-mentioned problems.

The embodiment of the present document provides a transmission monitoring method, comprising: in a case that an input port of a network node receives M frames, counting the number N of frames sent by an output port of the network node corresponding to the received M frames; and in a case that the M is different from the N, determining that frame loss exists in the network node; wherein the M and the N are positive integers.

Alternatively, the step of counting the number N of frames sent by an output port of the network node corresponding to the received M frames in a case that an input port of a network node receives M frames comprises: measuring the number of received frames of frames received by the input port, and sending the number of received frames to the output port; when the output port receives the number of received frames, measuring the number of transmitted frames of frames sent by the current output port; and calculating a first difference value of the number of received frames received by the output port at this time and the number of received frames received by the output port last time as the M, and calculating a second difference value of the number of transmitted frames measured by the output port at this time and the number of transmitted frames measured by the output port last time as the N.

Alternatively, the step of sending the number of received frames to the output port comprises: sending the number of received frames carried in a measurement message frame to the output port.

Alternatively, the step of sending the number of received frames carried in a measurement message frame to the output port comprises: setting a specified identity for the measurement message frame, and sending the number of received frames carried in the measurement message frame to the output port.

Alternatively, the specified identity comprises at least one of the following: an address of the network node, a field at a position specified by the measurement message frame, a specified destination address, and a specified frame type.

Alternatively, under the situation that the M is different from the N, the method further comprises: obtaining the number of lost frames of the network node through calculating a difference value of the M and the N.

Alternatively, after the step of measuring the number of received frames of the frames received by the input port and sending the number of received frames to the output port, the method further comprises: determining there is a frame loss at the network node under the situation that the output port of the network does not receive the number of received frames in a specified duration.

Alternatively, the step of determining there is a frame loss at the network node under the situation that the output port of the network does not receive the number of received frames in a specified duration comprises: determining the number of lost frames of the network node as all frames.

Alternatively, the network node supports at least one of the following networks: a Multi-Protocol Label Switching (MPLS) network, a MPLS Transport Profile (MPLS-TP) network, and a Packet Transport Network (PTN), an internet protocol radio access network (IP-RAN), an Ethernet, and an IP network.

Alternatively, the number of received frames comprises at least one of the following: the number of received frames at a port layer, the number of received frames at a channel layer, and the number of received frames at a pseudo-wire layer; and/or, the number of transmitted frames comprises at least one of the following: the number of transmitted frames at a port layer, the number of transmitted frames at a channel layer, and the number of transmitted frames at a pseudo-wire layer.

The embodiment of the present document further provides a transmission monitoring apparatus, comprising: a counting module, configured to: in a case that an input port of a network node receives M frames, count the number N of frames sent by an output port of the network node corresponding to the received M frames; and a determining module, configured to: in a case that the M is different from the N, determining that frame loss exists in the network node; wherein the M and the N are positive integers.

Alternatively, the counting module comprises: a first measuring module, configured to: measure the number of received frames of frames received by the input port; a transmitting module, configured to: send the number of received frames to the output port; a second measuring module, configured to: when the output port receives the number of received frames, measure the number of transmitted frames of frames sent by the current output port; and a first calculating module, configured to: calculate a first difference value of the number of received frames received by the output port at this time and the number of received frames received by the output port last time as the M, and calculate a second difference value of the number of transmitted frames measured by the output port at this time and the number of transmitted frames measured by the output port last time as the N.

Alternatively, the apparatus further comprises: a second calculating module, configured to: obtain the number of lost frames of the network node through calculating a difference value of the M and the N.

Through the method and apparatus of the present document, adopted is the mode of counting the number N of frames sent by an output port of the network node corresponding to the received M frames in a case that an input port of a network node receives M frames; and determining that frame loss exists in the network node in a case that the M is different from the N, the problems of failing to determine a specific device where the frame loss occurs and the construction cost being high are solved, and the accuracy and the flexibility of monitoring a position of the frame loss are improved, and the construction cost is reduced.

BRIEF DESCRIPTION OF DRAWINGS

The accompanying drawings described herein are used to provide a further understanding for the present document and constitute a part of the present application. The illustrated embodiments of the present document and the description thereof are used to explain the present document, rather than constituting an inappropriate limitation to the present document. In the drawings.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other.

Figure 2:
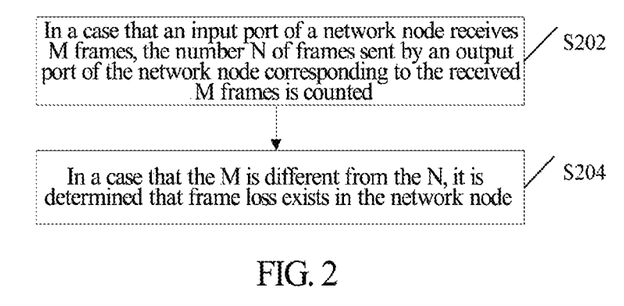
FIG. 2 a flow chart of a transmission monitoring method according to an embodiment of the present document.

The present embodiment provides a transmission monitoring method, and FIG. 2 is the flow chart of the transmission monitoring method according to the embodiment of the present document.

In step S202, in a case that an input port of a network node receives M frames, the number N of frames sent by an output port of the network node corresponding to the received M frames is counted.

In step S204, in a case that the M is different from the N, it is determined that frame loss exists in the network node.

Through the above-mentioned steps, the present embodiment compares the number M of frames input into the network node with the corresponding number N of frames output from the network node; under the situation that the M is different from the N, then it is illustrated that the phenomenon of frame loss exists in the dataflow during the process of passing through the network node, thus determining that the specific position of the frame loss is on the network node, solving the problems of failing to determine a specific device where the frame loss occurs and the construction cost being high in the related art, improving the accuracy and the flexibility of monitoring a position of the frame loss, and reducing the construction cost.

As a preferred embodiment, in step S202, the number of received frames of frames received by the input port can be measured, and the number of received frames is sent to the output port; when the output port receives the number of received frames, the number of transmitted frames sent by the current output port is measured; and a first difference value of the number of received frames received by the output port at this time and the number of received frames received by the output port last time is calculated as the M, and a second difference value of the number of transmitted frames measured by the output port at this time and the number of transmitted frames measured by the output port last time is calculated as the N. Through this way, the number N of output frames corresponding to the number M of input frames can be counted accurately, and this method is easy to be realized.

After the input port counts the number of received frames, it can send the number of received frames to the output port through many ways. Alternatively, the number of received frames can be carried in a measurement message frame and sent to the output port. The influence to the transmission from the input port to the output port in the network node by sending the number of received frames through this way is smaller.

Alternatively, under the situation of sending the number of received frames through the measurement message frame to the output port, a specified identity can be set for the measurement message frame, and then the number of received frames carried in the measurement message frame is sent to the output port. Through this way, the output port can identify the above-mentioned measurement message frame in the dataflow conveniently, thus rapidly and accurately obtaining the number of received frames, and then being able to obtain the number of transmitted frames more accurately, thereby improving the monitoring accuracy.

Alternatively, the measurement message frame can be identified by at least one of the following modes: an address of the network node, a field at a position specified by the measurement message frame, a specified destination address, and a specified frame type, etc.

The measurement message frame in the present embodiment is different from the LMM and the LMR. The LMM and the LMR can only be used for being sent and responded by the MEP, and limited in the OAM technology. While the measurement message frame of the present method is for usage within the device node, and will not be transmitted to the outside of the device, wherein the specified identity (also called special identifier) includes but not limited to the address of the present device node, the specific position field of the frame, the specific destination address, and the specific frame type, etc., and the frame does not need to be replied. So, the measurement message and the measurement message frame in the present embodiment are all different from the frame formats, the frame contents and the processing methods of the LMM and LMR.

As a preferable embodiment, under the situation that the M is different from the N, except for being able to determine that the frame loss exists in the network node, the number of lost frames of the network node also can be calculated, and the number of lost frames=M−N.

In addition, after sending the number of received frames to the output port, if the output port does not receive the number of received frames in the specified duration, then it is illustrated that the frame loss exists in the network node, and it also can illustrate that the failure occurs in the connectivity within the network node, and the frames are all lost, therefore, in this case, it can be determined that the number of lost frames of the network node are all frames.

Alternatively, the above-mentioned network node can be the device supporting at least one of the following networks: a Multi-Protocol Label Switching (MPLS) network, a MPLS Transport Profile (MPLS-TP) network, and a Packet Transport Network (PTN), an internet protocol radio access network (IP-RAN), an Ethernet, and an IP network, etc.

Alternatively, the number of received/transmitted frames can be the number of received/transmitted frames at a port layer, the number of received/transmitted frames at a channel layer, and also can be the number of received/transmitted frames at pseudo-wire layer.

Corresponding to the above-mentioned method, the present embodiment further provides a transmission monitoring apparatus, and the apparatus is used for realizing the above-mentioned embodiment and the preferable embodiments, and the contents which have already been explained will no longer go into details. As the following used, the term "module" can be the combination of the software and/or the hardware for realizing the preset function. Although the apparatus described by the following embodiment is preferably realized by the software, it is possible and may be conceived to be realized by the hardware or the combination of the software and the hardware.

Figure 3:
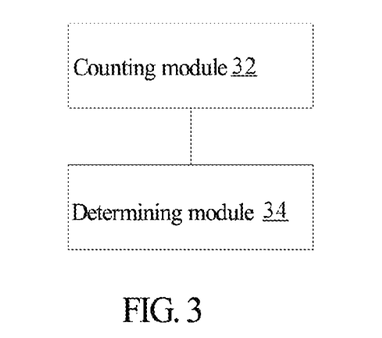
FIG. 3 is a structure block diagram of a transmission monitoring apparatus according to an embodiment of the present document.

FIG. 3 is a structure block diagram of a transmission monitoring apparatus according to an embodiment of the present document. As shown in FIG. 3, the apparatus includes a counting module 32 and a determining module 34. Each module is explained in detail hereinafter.

The counting module 32 is configured to: in a case that an input port of a network node receives M frames, count the number N of frames sent by an output port of the network node corresponding to the received M frames; and the determining module 34 is connected with the counting module 32 and configured to: in a case that the M is different from the N, determine that frame loss exists in the network node.

In the above-mentioned modules of the present embodiment, the determining module 34 compares the number M of frames input into the network node with the corresponding number N of frames output from the network node; under the situation that the M is different from the N, then it is illustrated that the phenomenon of frame loss exists in the dataflow during the process of passing through the network node, thus determining that the specific position of the frame loss is on the network node, solving the problems of failing to determine a specific device where the frame loss occurs and the construction cost being high in the related art, improving the accuracy and the flexibility of monitoring a position of the frame loss, and reducing the construction cost.

Figure 4:
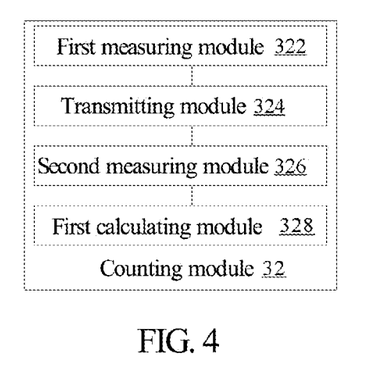
FIG. 4 is a preferable structure block diagram of a counting module according to an embodiment of the present document.

FIG. 4 is a preferable structure block diagram of the counting module 32 according to an embodiment of the present document. As shown in FIG. 4, the counting module 32 can include: a first measuring module 322, configured to: measure the number of received frames of frames received by the input port; a transmitting module 324, connected with the first measuring module 322 and configured to: send the number of received frames measured by the first measuring module 322 to the output port; a second measuring module 326, connected with the transmitting module 324 and configured to: when the output port receives the number of received frames, measure the number of transmitted frames of the frames sent by the current output port; and a first calculating module 328, connected with the second measuring module 326 and configured to: calculate a first difference value of the number of received frames received by the output port at this time and the number of received frames received by the output port last time as the M, and calculate a second difference value of the number of transmitted frames measured by the output port at this time and the number of transmitted frames measured by the output port last time as the N.

Figure 5:
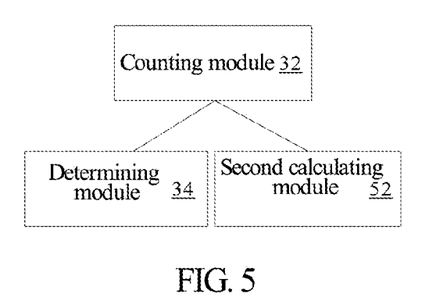
FIG. 5 is a preferable structure block diagram of a transmission monitoring apparatus according to an embodiment of the present document.

FIG. 5 is a preferable structure block diagram of a transmission monitoring apparatus according to an embodiment of the present document. As shown in FIG. 5, the apparatus further can include: a second calculating module 52, connected with the counting module 32 and configured to: obtain the number of lost frames of the network node through calculating a difference value of the M and the N.

It is explained by combining with the preferable embodiment hereinafter, and the following preferable embodiment combines the above-mentioned embodiment and its preferable embodiments. The measurement message frame in the present embodiment is different from the LMM and the LMR. The LMM and the LMR can only be used for being sent and responded by the MEP, and limited in the OAM technology. While the measurement message frame of the present method is for usage within the device node, and will not be transmitted to the outside of the device, wherein the special identifier includes but not limited to the address of the present device node, the specific position field of the frame, the specific destination address, and the specific frame type, etc., and the frame does not need to be replied. So, the measurement message and the measurement message frame in the present method are all different from the frame formats, the frame contents and the processing methods of the LMM and LMR.

Embodiment One

The present preferable embodiment provides a method for monitoring the device node transmission, and the method is a method for monitoring a single device node transmission based on the packet switching network. The method can measure whether the specific node has the frame loss and its count of lost frames.

The method for monitoring the device node transmission in the preferable embodiment includes the following steps.

In step one, the first port and the second port of the device perform statistics on the frame count, wherein the first port is the ingress port (that is, the input port) for monitoring the flow rate on the device node, and the second port is the egress port (that is, the output port) for monitoring the flow rate on the device node.

In step two, the device inserts the measurement message frame from the first port, carries the count of received frames of the current first port in the measurement message frame, and carries the special identifier in the measurement message frame.

In step three, the device sends the measurement message frame continuously to the second port for many times.

In step four, the device extracts the measurement message frame at the second port according to the special identifier of the frame, and reads the count of transmitted frames of the current second port.

In step five, the devices calculates the count of lost frames from the first port to the second port according to the count of received frames of the first port carried in the measurement message frame received at this time, the count of transmitted frames of the current second port read at this time, the count of received frames of the first port carried in the measurement message frame received last time and the count of transmitted frames of the current second port read last time.

By adopting the above-mentioned method, it can measure conveniently the count of lost frames within the device node, thus monitoring the transmission situation within the present device, while it does not need the protocol cooperation and connection among the devices, nor the device to support the complicated functions, such as the OAM, etc., and it is very easy to be applied, deployed and realized. The function in the preferable embodiment is started; when there is a failure in the network which causes the frame loss, it can accurately locate the node causing the frame loss specifically and can respectively measure the respective count of lost frames of each device node own, which is very convenient for the quick and accurate fault positioning, maintaining and managing of the network, which does not increase the construction cost at the same time and will not produce the negative effect to the forwarding performance of the device, etc.

Figure 6:
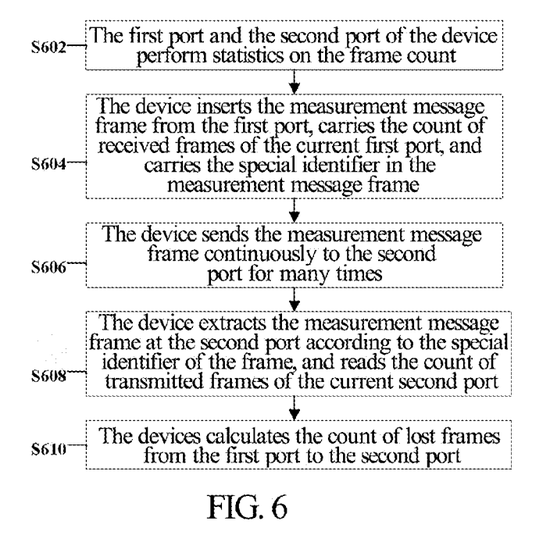
FIG. 6 is a flow chart of a method for monitoring a device node transmission according to an embodiment of the present document.

FIG. 6 is a flow chart of a method for monitoring a device node transmission according to an embodiment of the present document. As shown in FIG. 6, the method can include the following steps.

In step S602: the first port and the second port of the device perform statistics on the frame count.

In step S604: the device inserts the measurement message frame from the first port, carries the count of received frames of the current first port in the measurement message frame, and carries the special identifier in the measurement message frame.

In step S606, the device sends the measurement message frame continuously to the second port for many times.

In step S608, the device extracts the measurement message frame at the second port according to the special identifier of the frame, and reads the count of transmitted frames of the current second port.

In step S610, the devices calculates the count of lost frames from the first port to the second port according to the count of received frames of the first port carried in the measurement message frame received at this time, the count of transmitted frames of the current second port read at this time, the count of received frames of the first port carried in the measurement message frame received last time, and the count of transmitted frames of the current second port read last time.

The measurement message frame in the present method is different from the LMM and the LMR. The LMM and the LMR can only be used for being sent and responded by the MEP, and limited in the OAM technology. While the measurement message frame of the present method is for usage within the device node, and will not be transmitted to the outside of the device, wherein the special identifier includes but not limited to the address of the present device node, the specific position field of the frame, the specific destination address, and the specific frame type, etc., and the frame does not need to be replied. So, the measurement message and the measurement message frame in the present method are all different from the frame formats, the frame contents and the processing methods of the LMM and LMR.

Embodiment Two

Figure 7:
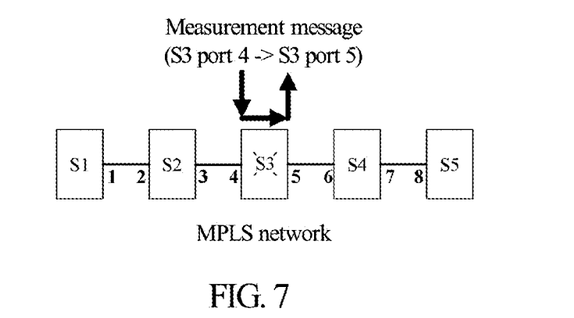
FIG. 7 is a diagram of a frame loss measurement method of a MPLS network according to embodiment two of the present document.

FIG. 7 is a diagram of a frame loss measurement method of a MPLS network according to embodiment two of the present document. As shown in FIG. 7, the Multi-Protocol Label Switching (abbreviated as, MPLS) network, the MPLS Transport Profile (abbreviated as, MPLS-TP) network, the Packet Transport Network (abbreviated as, PTN), or the internet protocol radio access network (abbreviated as, IP-RAN) are all relatively typical packet switching network. The nodes S1 to S5 are the device nodes supporting the MPLS-TP network. When there is the frame loss within the node S3, by adopting the method for measuring the OAM frame loss, although it can be measured that there is the frame loss in the path between the node S1 and S5, it still cannot measure the specific node position where the frame loss occurs.

By adopting the method in the present preferable embodiment, statistics are performed on the count of received/transmitted frames in the node required to be measured; for example, in the node S3, statistics are performed on the frame count for the ports 4 and 5. The several frame counts are represented as follows:

RxS: the count of local received frames of the source port of the measurement message frame when sending the measurement message frame, and the received frames are the frames sent to the destination port of the measurement message frame, which is the frame count of other nodes received by the port 4 in the present embodiment, and these frames are transmitted to the port 5;

TxD: the count of local transmitted frames of the destination port of the measurement message frame when receiving the measurement message frame, and the transmitted frames are frames transmitted from the source port of the measurement message frame, which is the frame count sent by the port 5 to other nodes in the present embodiment, and these frames are transmitted to the port 5 from the port 4.

The above-mentioned frame count information can be the count of received frames or the count of transmitted frames at the port layer, the channel layer or the pseudo-wire layer, or can be the combination of the above-mentioned counts, so long as it is ensured that the data frame is received in from the source port of the measurement message frame of the node, transmitted to the destination port of the measurement message frame and then sent out from the destination port of the measurement message frame.

The node S3 inserts the measurement message frame from the port 4 continuously, and the destination port of the measurement message frame is the port 5. The measurement message frame carries the frame count information (that is, RxS) which is received from other nodes and transmitted to the port 5 by the port 4, and a certain specific position of the measurement message frame (such as, at the place where the first address is added by 100 bytes) is set as the specific identifier (such as, 0x03030303); in this way, when the measurement message frame is transmitted to the port 5, the node S3 extracts the measurement message frame according to the specific identifier of the frame, and reads the frame count (that is, RxD) which is received from the port 4 and sent to other nodes by the current port 5.

After the node receives the measurement message frame at this time, if the RxS carried in measurement message frame is RxS [tc] and the read TxD of the destination port is TxD [tc], and the above-mentioned count values last time are RxS [tp] and TxD [tp] respectively, then the count of lost frames calculated by the node is as follows: Frame Loss [src-des]=|RxS[tc]−RxS[tp]|−|TxD[tc]−TxD[tp]|.

Figure 8:
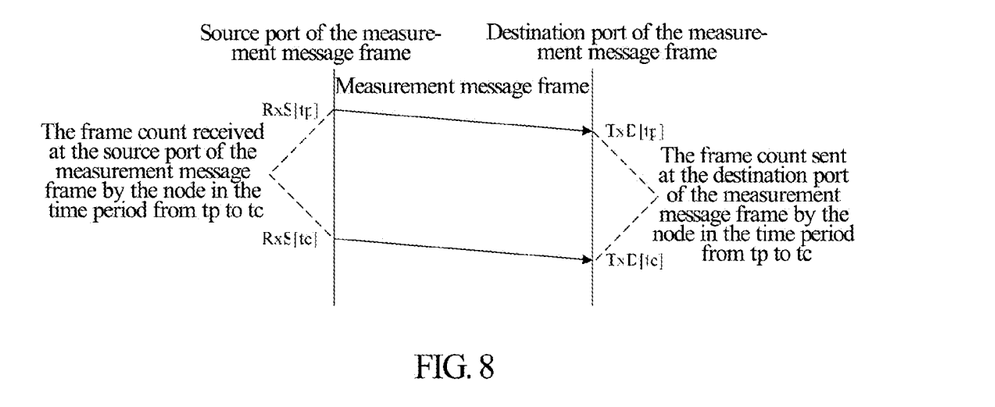
FIG. 8 is a diagram with detailed descriptions of a frame loss measurement method of a MPLS network according to embodiment two of the present document.

FIG. 8 is a diagram with detailed descriptions of a frame loss measurement method of a MPLS network according to embodiment two of the present document. As shown in FIG. 8, |RxS[tc]-RxS[tp]| represents the frame count received from the external node and transmitted to the destination port of the measurement message frame by the node at the source port of the measurement message frame in a time period from tp to tc, and the |TxD[tc]−TxD[tp]| represents the frame count transmitted from the source port of the measurement message frame and sent to other nodes by the node at the destination port of the measurement message frame in the time period from tp to tc. So, the |RxS[tc]−RxS[tp]|−|TxD[tc]−TxD[tp]| is the count of lost frames transmitted from the source port of the measurement message frame to the destination port of the measurement message frame within the node in the time period from tp to tc; if the count of lost frames is 0, it is illustrated that there is no frame loss; if the count of lost frames is greater than 0, then it is illustrated that there is the frame loss within the node, and the number of lost frames is the calculated value.

In addition, after the node sends out the measurement message frame, it cannot receive the measurement message frame from the destination port during a certain period of time (such as 5 seconds), then it is illustrated that the connectivity failure occurs within the node, and the frames are all lost, and the count of lost frames is all frames.

Embodiment Three

Figure 9:
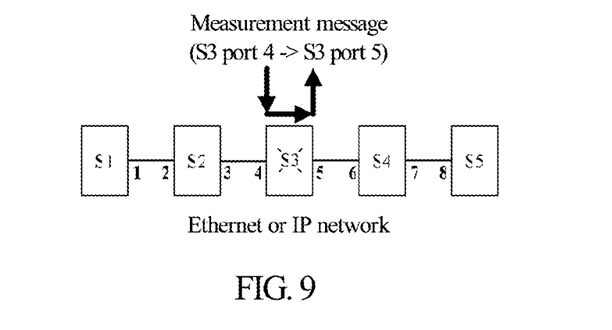
FIG. 9 is a diagram of a frame loss measurement method of an Ethernet or an IP network according to embodiment three of the present document.

FIG. 9 is a diagram of a frame loss measurement method of an Ethernet or an IP network according to embodiment three of the present document. The Ethernet or the IP network is also relatively typical packet switching network. By adopting the method in the present preferable embodiment, statistics are performed on the count of received/transmitted frames in the node required to be measured, for example, measuring in the node S3. The difference between the present preferable embodiment and the embodiment two is as follows: the above-mentioned frame count information can be the count of received frames or the count of transmitted frames at the port layer, the Virtual Local Area Network (abbreviated as VLAN) layer or the IP layer, or can be the combination of the above-mentioned counts; in the identifier of the measurement message frame, according to the characteristic of the Ethernet or the IP network, the identifier can be the specific destination address (for example, the destination address is set as 0), the specific frame type, an agreed value of a certain specific field or the combination of the above-mentioned, etc.

As shown in FIG. 9, the nodes S1 to S5 are the device nodes supporting the Ethernet or IP network. When there is the frame loss within the node S3, by adopting the method for measuring the OAM frame loss, although it can be measured that there is the frame loss in the path between the node S1 and S5, it still cannot measure the specific node position where the frame loss occurs.

By adopting the method in the present preferable embodiment, statistics are performed on the count of received/transmitted frames in the node required to be measured; for example, in the node S3, statistics are performed on the frame count for the port 4 and 5. The several frame counts are represented as follows:

RxS: the count of local received frames of the source port of the measurement message frame when sending the measurement message frame, and the received frames is the frames sent to the destination port of the measurement message frame, which is the frame count of other nodes received by the port 4 in the present embodiment, and these frames are transmitted to the port 5;

TxD: the count of local transmitted frames of the destination port of the measurement message frame when receiving the measurement message frame, and the transmitted frames are the frames transmitted from the source port of the measurement message frame, which is the frame count sent by the port 5 to other nodes in the present embodiment, and these frames are transmitted to the port 5 from the port 4.

The node S3 inserts the measurement message frame from the port 4 continuously, and the destination port of the measurement message frame is the port 5. The measurement message frame carries the frame count information (that is, RxS) which is received from other nodes and transmitted to the port 5 by the port 4, and a certain specific position of the measurement message frame (such as, the destination address is set as 0) is set as the specific identifier; in this way, when the measurement message frame is transmitted to the port 5, the node S3 extracts the measurement message frame according to the specific identifier of the frame, and reads the frame count (that is, RxD) which is received from the port 4 and sent to other nodes by the current port 5.

After the node receives the measurement message frame at this time, if the RxS carried in measurement message frame is RxS [tc] and the read TxD of the destination port is TxD [tc], and the above-mentioned count values last time are RxS RN and TxD RN respectively, then the count of lost frames calculated by the node is as follows: Frame Loss [src-des]=|RxS[tc]−RxS[tp]|−|TxD[tc]−TxD[tp]|.

In addition, after the node sends out the measurement message frame, it cannot receive the measurement message frame from the destination port during a certain period of time (such as 5 seconds), then it is illustrated that the connectivity failure occurs within the node, and the frames are all lost, and the count of lost frames is all frames.

In another embodiment, it further provides a kind of software, and the software is used for performing the technical scheme described in the above-mentioned embodiment and the preferable embodiment.

In another embodiment, it further provides a storage medium, and the storage medium stores the above-mentioned software, and the storage medium includes but not limited to the CD, the floppy disk, the hard disk, and the writable storage, etc.

Obviously, it can be understood by those skilled in the art that each module or each step above-mentioned in the present document can be implemented by the universal calculating apparatus, and they can be integrated in a single calculating apparatus, or distributed in the network made up of a plurality of calculating apparatus. Alternatively, they can be implemented by the executable program codes of the calculating apparatus. Accordingly, they can be stored in the storage apparatus and implemented by the calculating apparatus, and in certain circumstance, they can be executed in a order different from the one described herein or in steps different from the described steps herein, or they are made to various integrated circuit module respectively, or a plurality of modules or steps therein are made into the single integrated circuit module to be implemented. In this way, the embodiments of the present document are not limit to any specific form of the combination of the hardware and software.

The above description is only the preferred embodiments of the present document and is not intended to limit the present document. For those skilled in the art, the present document can have various modifications and variations. All of modifications, equivalents and/or variations without departing from the spirit and essence of the present document should be embodied in the protection scope of the present document.

INDUSTRIAL APPLICABILITY

Through the method and apparatus of the present document, adopted is the mode of counting the number N of frames sent by an output port of the network node corresponding to the received M frames in a case that an input port of a network node receives M frames; and determining that frame loss exists in the network node in a case that the M is different from the N, the problems of failing to determine a specific device where the frame loss occurs and the construction cost being high are solved, the accuracy and the flexibility of monitoring a position of the frame loss are improved, and the construction cost is reduced.

What we claim is:

1. A transmission monitoring method, comprising:
   in a case that an input port of a network node receives M frames, counting the number N of frames sent by an output port of the network node corresponding to the received M frames; and
   in a case that the M is different from the N, determining that frame loss exists in the network node;
   wherein the step of counting the number N of frames sent by an output port of the network node corresponding to the received M frames in a case that an input port of a network node receives M frames comprises:
   measuring the number of received frames of frames received by the input port, and sending the number of received frames to the output port;

when the output port receives the number of received frames, measuring the number of transmitted frames of frames sent by the current output port; and calculating a first difference value of the number of received frames received by the output port at this time and the number of received frames received by the output port last time as the M, and calculating a second difference value of the number of transmitted frames measured by the output port at this time and the number of transmitted frames measured by the output port last time as the N;

wherein the M and the N are positive integers.

2. The method according to claim 1, wherein the step of sending the number of received frames to the output port comprises:

sending the number of received frames carried in a measurement message frame to the output port.

3. The method according to claim 2, in the case that the M is different from the N, further comprising:

obtaining the number of lost frames of the network node through calculating a difference value of the M and the N.

4. The method according to claim 2, after the step of measuring the number of received frames of frames received by the input port and sending the number of received frames to the output port, further comprising:

determining there is a frame loss at the network node in a case that the output port of the network does not receive the number of received frames in a specified duration.

5. The method according to claim 2, wherein the step of sending the number of received frames carried in a measurement message frame to the output port comprises:

setting a specified identity for the measurement message frame, and sending the number of received frames carried in the measurement message frame to the output port.

6. The method according to claim 5, in the case that the M is different from the N, further comprising:

obtaining the number of lost frames of the network node through calculating a difference value of the M and the N.

7. The method according to claim 5, after the step of measuring the number of received frames of frames received by the input port and sending the number of received frames to the output port, further comprising:

determining there is a frame loss at the network node in a case that the output port of the network does not receive the number of received frames in a specified duration.

8. The method according to claim 5, wherein the specified identity comprises at least one of following: an address of the network node, a field at a position specified by the measurement message frame, a specified destination address, and a specified frame type.

9. The method according to claim 8, in the case that the M is different from the N, further comprising:

obtaining the number of lost frames of the network node through calculating a difference value of the M and the N.

10. The method according to claim 8, after the step of measuring the number of received frames of frames received by the input port and sending the number of received frames to the output port, further comprising:

determining there is a frame loss at the network node in a case that the output port of the network does not receive the number of received frames in a specified duration.

11. The method according to claim 1, in the case that the M is different from the N, further comprising:

obtaining the number of lost frames of the network node through calculating a difference value of the M and the N.

12. The method according to claim 1, after the step of measuring the number of received frames of frames received by the input port and sending the number of received frames to the output port, further comprising:

determining there is a frame loss at the network node in a case that the output port of the network does not receive the number of received frames in a specified duration.

13. The method according to claim 12, wherein the step of determining there is a frame loss at the network node in a case that the output port of the network does not receive the number of received frames in a specified duration comprises: determining the number of lost frames of the network node as all frames.

14. The method according to claim 1, wherein the network node supports at least one of following networks: a Multi-Protocol Label Switching (MPLS) network, a MPLS Transport Profile (MPLS-TP) network, and a Packet Transport Network (PTN), an internet protocol radio access network (IP-RAN), an Ethernet, and an IP network.

15. The method according to claim 1, wherein the number of received frames comprises at least one of following: a number of received frames at a port layer, a number of received frames at a channel layer, and a number of received frames at pseudo-wire layer; and/or, the number of transmitted frames comprises at least one of following: a number of transmitted frames at a port layer, a number of transmitted frames at a channel layer, and a number of transmitted frames at a pseudo-wire layer.

16. The method according to claim 1, in the case that the M is different from the N, further comprising:

obtaining the number of lost frames of the network node through calculating a difference value of the M and the N.

17. A transmission monitoring apparatus, comprising a processor, and a storage device for storing computer executable instructions that when executed by the processor cause the processor to perform the steps in following modules:

a counting module, configured to: in a case that an input port of a network node receives M frames, count the number N of frames sent by an output port of the network node corresponding to the received M frames; and a determining module, configured to: in a case that the M is different from the N, determine that frame loss exists in the network node;

wherein, the counting module comprises:

a first measuring module, configured to: measure the number of received frames of frames received by the input port;

a transmitting module, configured to: send the number of received frames to the output port;

a second measuring module, configured to: when the output port receives the number of received frames, measure the number of transmitted frames of frames sent by the current output port; and a first calculating module, configured to: calculate a first difference value of the number of received frames received by the output port at this time and the number of received frames received by the output port last time as the M, and calculate a second difference value of the number of transmitted frames measured by the output port at this time and the number of transmitted frames measured by the output port last time as the N;

wherein the M and the N are positive integers.

18. The apparatus according to claim 17, further comprising:

a second calculating module, configured to: obtain the number of lost frames of the network node through calculating a difference value of the M and the N.

* * * * *